United States Patent

[11] 3,604,525

[72] Inventors Charles B. Blethen
Green Mountain;
James E. Smith, Longmont, both of, Colo.
[21] Appl. No. 850,397
[22] Filed Aug. 15, 1969
[45] Patented Sept. 14, 1971
[73] Assignee Wm. Ainsworth, Inc.
Denver, Colo.

[54] AUTOMATIC TOP-LOADING WEIGH APPARATUS WITH ELECTRONIC MEASURING AND RECORDING CIRCUIT
10 Claims, 6 Drawing Figs.

[52] U.S. Cl. ........................................ 177/210, 177/212
[51] Int. Cl. ........................................ G01g 3/14
[50] Field of Search ............................. 177/1, 200, 210, 212, 211

[56] References Cited
UNITED STATES PATENTS
| | | | |
|---|---|---|---|
| 2,680,012 | 6/1954 | Bozoian | 177/210 X |
| 2,734,736 | 2/1956 | Payne | 177/212 X |
| 3,464,508 | 9/1969 | Engle et al. | 177/210 X |
| 3,368,637 | 2/1968 | Green et al. | 177/211 |

Primary Examiner—Richard B. Wilkinson
Assistant Examiner—George H. Miller, Jr.
Attorney—Reilly and Lewis ABSTRACT: A top-loading weigh apparatus has a stabilized balance beam mechanism with the load being vertically applied through a horizontal balance arm on a pair of spaced pivots, and a differential capacitance is developed by sensing the horizontal displacement of a stabilized beam isolated from the weighing area. The capacitance developed in response to beam displacement is converted into a variable current output and applied as a restoring force proportional to but in opposition to the unbalancing force in order to quickly and accurately return the beam mechanism to its null position. A voltage is developed in direct proportion to the variable current output required to restore the beam to its null position and which is translated for recording and visual display of the applied weight.

INVENTORS
CHARLES B. BLETHEN
JAMES E. SMITH

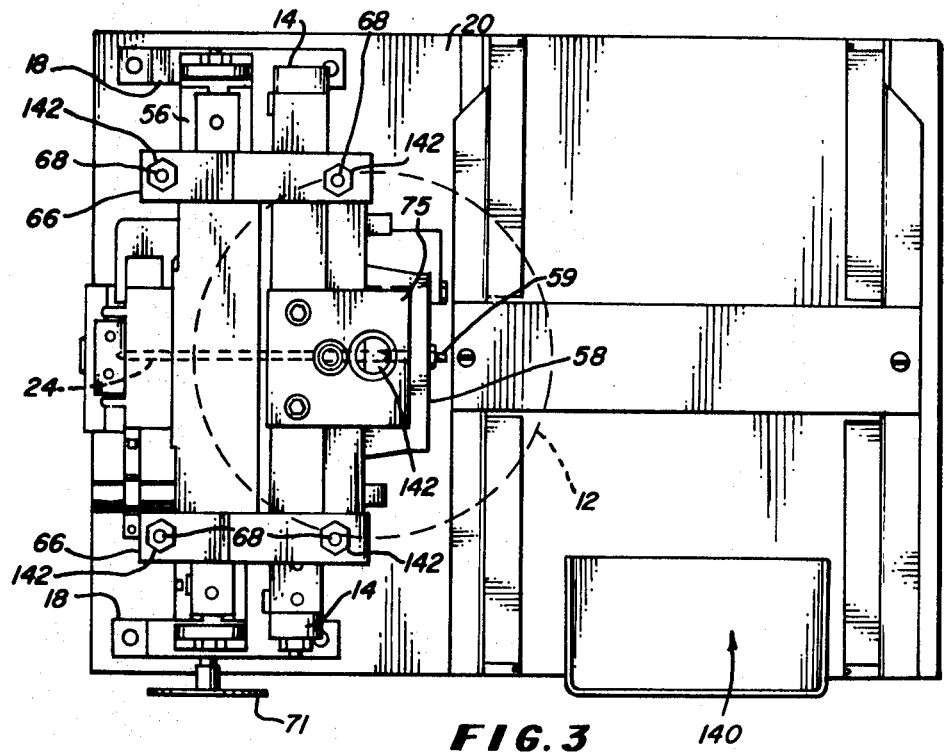
FIG. 3
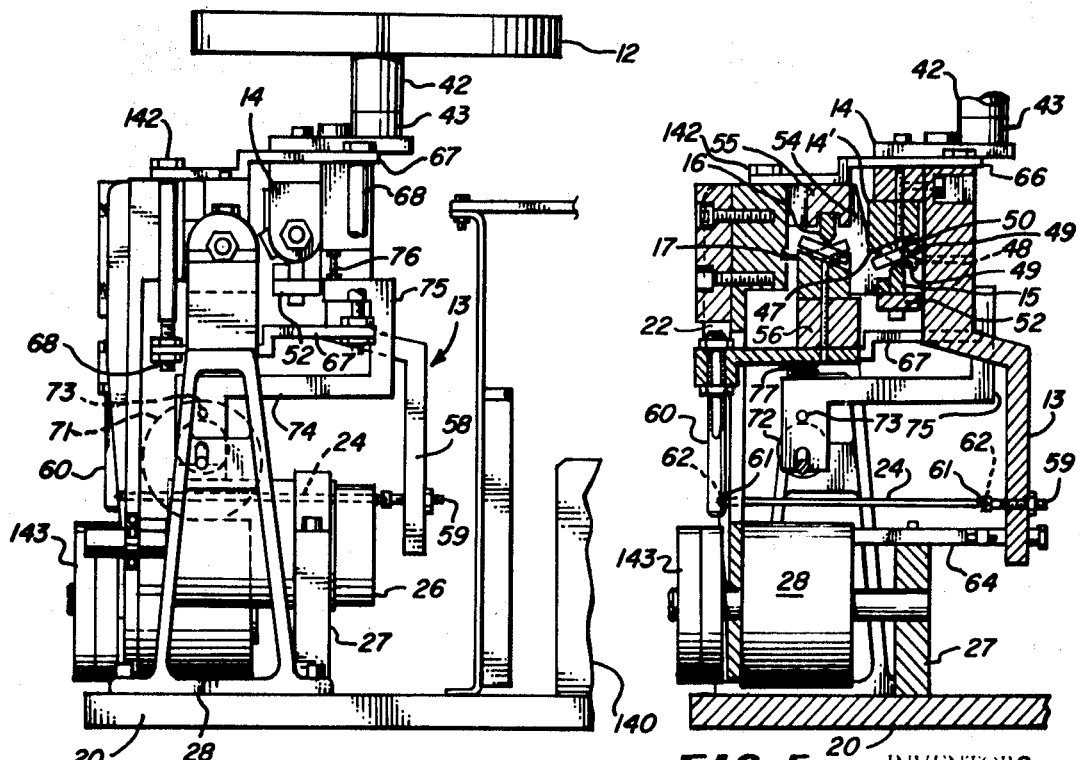
FIG. 4
FIG. 5
INVENTORS
CHARLES B. BLETHEN
JAMES E. SMITH
BY
*Reilly and Lewis*
ATTORNEY

AUTOMATIC TOP-LOADING WEIGH APPARATUS WITH ELECTRONIC MEASURING AND RECORDING CIRCUIT

This invention relates to a novel and improved weigh balance system and more particularly relates to an automatic top-loading weigh apparatus provided with means for electronically measuring and recording stationary weights in an accurate, highly dependable manner.

It is customary practice to provide weight balance mechanism systems wherein displacement of a beam is sensed and converted to an electrical control signal which in turn is converted and applied as a restoring force to maintain the beam in its null position; and the amplitude of the signal developed may be translated into a weight recording. There is a definite need, however, for a balance system, especially of the top-loading type, which minimizes instrument errors and inaccuracies in measurement and recording, either introduced in the mechanical weigh system or in the electronic sensing and signal generating circuit. It is therefore proposed, in accordance with the present invention, to devise a novel and improved weigh balance system for electronically measuring and recording stationary weights which is highly sensitive, accurate, and greatly reduces instrument errors in measurement and recording, such as, for example, errors resulting from the placement of weights at different locations on the weigh pan.

It is another objective and feature of the present invention to provide for a novel and improved null balance system capable of achieving rapid repetitive measurement and recording of stationary weights; and further, a balance system which will effect linear beam displacement under applied loads to generate a control signal and resultant restoring force proportional and in opposition to displacement of the beam in either a positive or negative direction from its null position.

It is a further object of the present invention to provide in an automatic weight-measuring and recording system for novel and improved monitor and control circuit means to capacitively sense displacement of the beam either in a positive or negative direction, to differentially measure such displacement and convert same to a variable current output which in turn is translated into a restoring force to return the beam to its null position, said circuit being characterized by its ability to respond to and accurately measure sudden weight increases without overloading of the circuit while being closely sensitive to minimal weight variations.

It is a still further object of the present invention to provide for a compact, highly sensitive, top-loading weigh apparatus which will accurately weigh and record stationary loads with very high precision and wherein the applied load is sensed through linear displacement of a stabilized vertical beam isolated from the load.

The present invention contemplates a top-loading weigh apparatus in which a load or unbalancing force is applied vertically to a stabilized balance mechanism having a balance arm supported by a pair of horizontally spaced, oppositely directed, knife-edged pivots. A pair of variable capacitors disposed between the apparatus frame and a vertical leg forming a part of the balance mechanism serves to develop a differential capacitance which can be accurately measured and converted into a variable current output. The output is translated and applied as a restoring force proportional but in opposition to the unbalancing force to instantaneously return the leg to its null position. A reference circuit including a resistor simultaneously generates a voltage in direct proportion to the current required to restore the beam to its null position.

In the electronic measuring circuit, the variable capacitors are incorporated as a part of a capacitive bridge between an oscillator employed to drive or excite the bridge and differential amplifier, the latter measuring the differential capacitance of the variable capacitors in the bridge, and the phase and amplitude of the output from the differential amplifier are detected by a sampling circuit to determine the direction and extent of movement of the beam leg. The sampling circuit demodulates the output of the amplifier while eliminating any unwarranted quadrature component from the output signal, and generates a DC voltage proportional to the differential capacitor. The voltage produced is amplified and translated into a variable current output to drive a forcer coil in a direction returning the vertical beam leg to its null position.

The above and other objects, advantages and features of the present invention will become more readily understood and appreciated from a consideration of the following detailed description of a preferred form thereof when taken together with the accompanying drawings, in which:

FIG. 3 is a top plan view thereof.

FIG. 4 is a side elevational view of the preferred form of top-loading weigh apparatus.

FIG. 5 is a sectional view taken about lines 5—5 of FIG. 2; and

Figure 1:
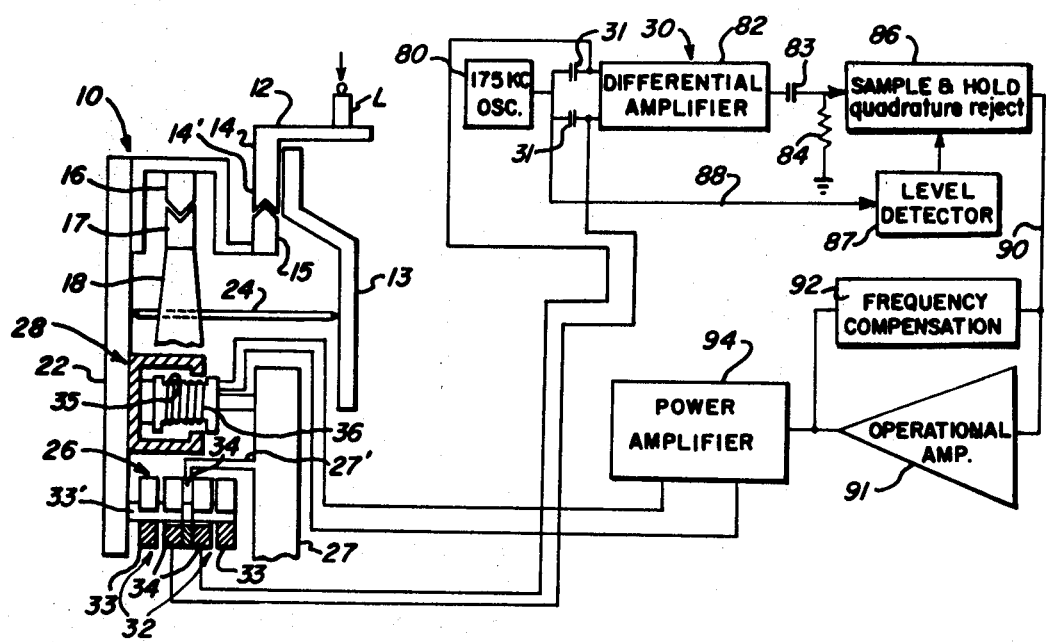
FIG. 1 is a block diagram of a preferred form of balance control system including a schematic illustration of a top-loading weigh apparatus.
Figure 2:
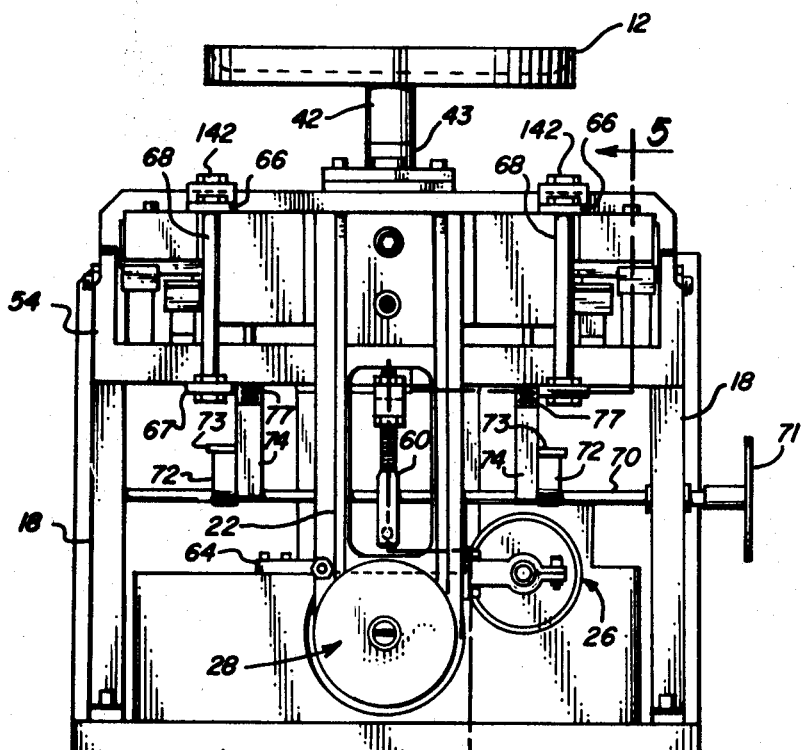
FIG. 2 is a front view of the preferred form of top-loading weigh apparatus in accordance with the present invention.

Referring in more detail to the drawings, there is schematically shown in FIG. 1 a preferred form of weigh apparatus in accordance with the present invention wherein a top-loading balance unit 10 is broadly comprised of a weigh pan 12 having a first vertical stirrup leg 13 depending downwardly from a stirrup 14, including a bearing mount 14', the latter resting on a first knife edge pivot 15. The upwardly facing knife edge pivot 15 is disposed in horizontally spaced relation to a second, downwardly facing knife edge pivot 16 which rests on a bearing mount 17 supported by columns 18 rising upwardly from base frame 20. The base frame 20 is shown in FIGS. 2–5. In addition, a second vertical beam leg 22 depends downwardly in spaced relation to the knife edge pivot 16. A stabilizer in the form of a horizontal pivot rod 24 extends between the legs 13 and 22 in order to form a parallelogram between the pivot rod, beam legs and spaced pivots whereby an applied load, such as, the load L in causing vertical displacement of the weigh pan 12 about the knife edge pivots 15 and 16 is accurately translated into horizontal substantially linear displacement of the legs 13 and 22. The displacement resulting from the applied load is multiplied through the increased length of the beam legs relative to the moment arm of the weigh pan about the pivot 16 and is sensed through the beam leg 22 which is isolated from the load in the manner shown. It is noted that regardless of where a load L is placed on the weigh pan 12 that the moment arm of the pan 12 is constant about the pivot 16 since all weight on the pan 12 is applied to the knife edge of the pivot 15. Further, since the leg 13 which depends from the stirrup 14 and the leg 22 are maintained parallel by the rod 24, the resultant force applied at the knife edge of the pivot 15 is always equal to the weight L on the weigh pan 12. Therefore, the balance unit 10 operates to weigh a load L on the weigh pan 12.

Figure 6:
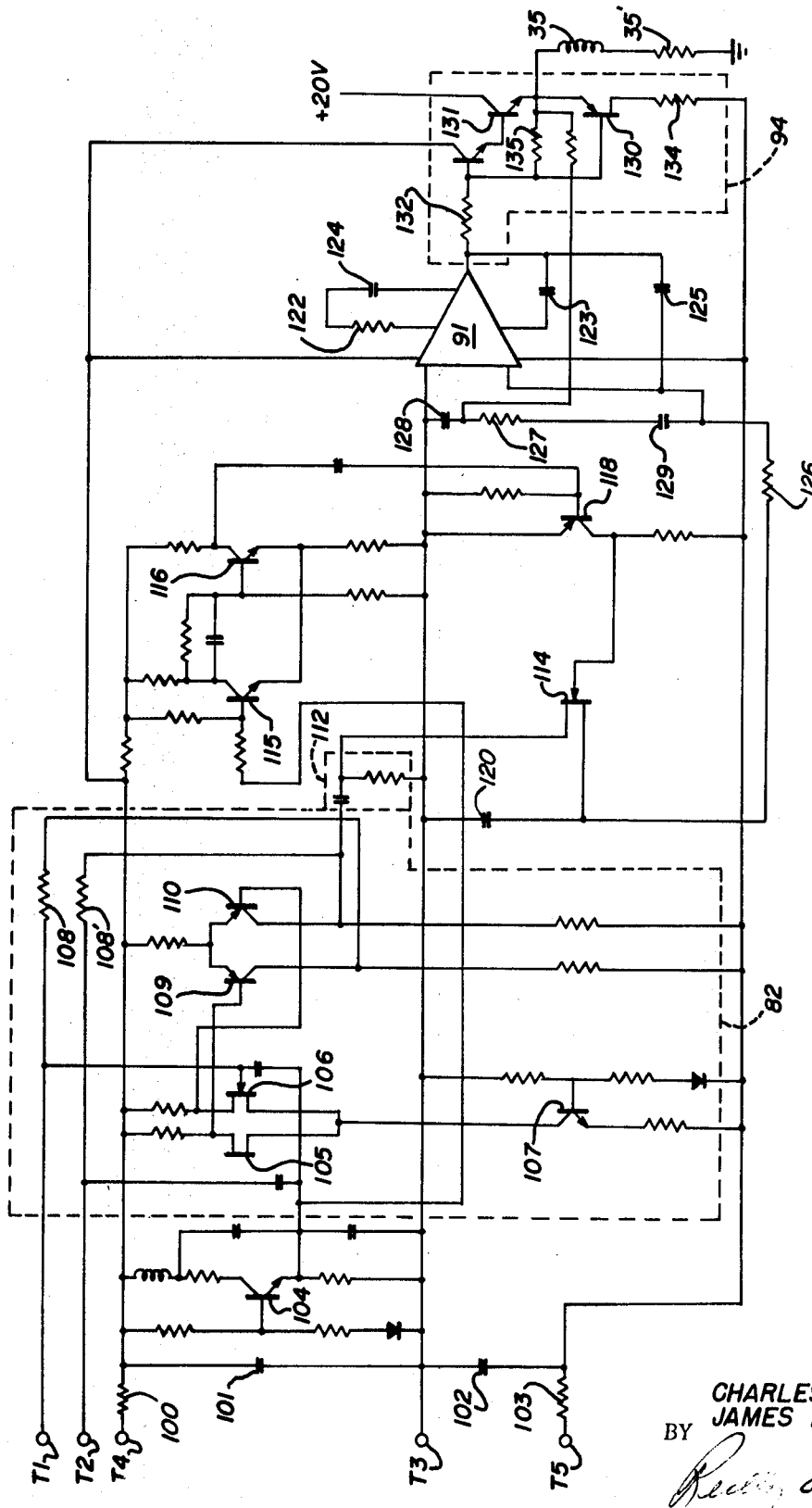
FIG. 6 is a circuit diagram of the preferred form of measuring and control circuit.

Horizontal displacement of the balance beam mechanism is accurately sensed through a sensor or probe, broadly designated at 26, which is arranged between an upright support member 27 on the frame and the lower end of the leg 22. Electromagnetic actuating means represented at 28 is similarly arranged between the lower end of the beam leg 22 and the frame support 27; and any displacement of the beam leg 22, as sensed by the sensor 26, is converted to an electrical signal through a monitor and control circuit represented at 30 which generates signals in the form of a variable current output proportional to displacement of the beam from its null position for application in the form of a restoring force to the actuating means 28. Specifically, in the preferred form, the sensor circuit is defined by a capacitive bridge comprising a pair of fixed capacitors 31 and a pair of variable capacitors 32. The variable capacitors are made up of sensor plate 33, supported on shaft 33' to follow movement of the beam leg 22, and disposed on opposite sides of a pair of sensor plates 34 separated by a phenolic insulator 34' and attached to an extension 27' of support 27. Thus, the beam-mounted plates 33 are movable with the beam with respect to the frame-mounted, or fixed, plates 34 so that movement of the beam in one direction will be reflected by an increased capacitance in one of the capacitors and a decrease in the other; whereas, movement of the beam in the opposite, or negative, direction is conversely reflected by an increased capacitance in the other variable capacitor and a decrease in the one capacitor. The relative increase or decrease in capacitance is differentially measured by the monitor and control circuit, converted to a variable output and is applied to the magnetic field of a forcer coil 35 which interacts with that of a permanent magnet 36 in the actuating means 28. A beam-restoring force proportional to the forcer coil current is therefore created to drive the beam back to its null position as indicated by the capacitor sensor plates 33 and 34. The coil current required to maintain a null position on the beam is also monitored through a reference circuit, including a reference resistor 35' in series with the forcer coil 35, as shown in FIG. 6, in which the voltage across the reference circuit is proportional to the coil current and hence proportional to the required beam restoring force. This voltage may be conventionally converted to a digital number through a digital volt meter for recording and visual display of the weight.

Considering in more detail the construction and arrangement of the balance unit 10, as shown in FIGS. 2 to 5, the weigh pan 12 has a downwardly extending sleeve 42 mounted on spindle 43 projecting upwardly from the stirrup 14, the latter having laterally spaced, downwardly depending bearing mounts 14'. Each bearing mount 14' is conventionally made up of downwardly facing, oppositely inclined surfaces 47 and 48, and flat metal bearing plates 49 are rollable on ball bearings 50 suitably contained in a plastic insert, now shown, between the bearing plates and surfaces 47 and 48. The bearing mount assemblies as described are self-centering on the upwardly projecting knife edge pivot 15 contained in a holder 52 which is affixed to one end of a balance arm 54. The arm 54 also supports a downwardly directed holder 55 for the second knife edge pivot 16 to support the pivot in downwardly facing relation to the front bearing mounts 17. The bearing mounts 17 are formed in a manner corresponding to that of the bearing mounts 14' and are supported on either side of a horizontal support 56 extending between column legs 18. It will therefore be seen that the front knife edge pivot 16 and bearing mount 17 are correspondingly formed to those of the rear pivot 15 and bearing mount 14' but in oppositely directed relation to one another.

The weigh pan 12 extends rearwardly in horizontally offset relation to the first pivot 15, and the rear leg 13 extends vertically from connected relation to the stirrup 14, inclines rearwardly and downwardly and terminates in a lower vertically disposed leg portion 58 which supports a threadedly adjustable horizontal pivot 59 for the pivot rod 24. In turn, the vertical beam leg 22 depends downwardly from the opposite end of the balance arm 54, and the leg 22 is provided with a vertically adjustable pivot 60 disposed in a central opening therein. The horizontal pivot rod 24 has jewelled bearings at opposite ends 61 for insertion in shallow concave recesses 62 in the horizontal and vertical pivots 59 and 60, respectively. The pivots 59 and 60 are threadedly adjustable as illustrated to permit accurate vertical and horizontal adjustment of the pivot rod between the legs 13 and 22 with the pivot rod supporting the legs in spaced parallel relation to one another. Here the horizontal balance arm 54 together with the vertical legs 13 and 22 and pivot rod 24 form a parallelogram which is accurately adjustable through the pivot mounts on the legs to respond to variable loads placed on any part of the weigh pan without error. Moreover, a horizontal limit bar 64 is adjustably mounted for extension between the frame 27, the front beam leg 22 and the rear stirrup leg 13 in order to limit horizontal displacement of the legs 13 and 22 in response to application of a given weight thereby confining displacement of the legs to a nearly linear path and prevent swinging in a wide circular arc.

In order to limit vertical shifting of the balance mechanism when in use, upper and lower connected plates 66 and 67 are arranged above and beneath the bearing mounts and knife edge pivots between the column legs by connecting bolts 68. In order to shift the bearing mounts away from the knife edge pivots when not in use, an arrestment device includes a transverse horizontal shaft 70 extending between the column legs 18 and having a pair of cams 72 on either side of the beam leg 22. The cams 72, when rotated by handle 71 will engage a pair of pins 73 to shift a pair of associated arms 74 upwardly. The arms 74 have vertical extensions 75 with abutments 76 engageable with shoulders on the rear stirrup leg 13, and upwardly extending posts 77 are engageable with the lower plate 67 to simultaneously lift the legs 13 and 22 a distance sufficient to separate the bearing mounts from their respective knife edge pivots. The posts 77 are spring-loaded normally to urge the arms 74 downwardly against the arrestment cams 72. Thus, when the cams are released, the upper bearing amount 14 and knife edge pivot 16 as described are free to return to centered relation against the lower knife edge pivot 15 and bearing mount 17.

Referring in more detail to the monitor and control circuit 30 shown in FIG. 1, it will be observed that the fixed capacitors 31 of the capacitive bridge circuit are arranged in parallel between an oscillator 80, used to excite the sensor plates, and a differential amplifier represented at 82. The output of the differential amplifier is a sinusoid with an amplitude that is proportional to the difference between the two variable capacitors 32; and the phase of the differential amplifier output will either lead or lag that of the oscillator 80 depending upon the relative magnitude of the variable capacitors 32. A capacitor 83 and resistor 84 at the output of the amplifier serves to eliminate the DC portion of the amplifier output into a sample and hold circuit represented at 86. A level detector circuit 87, preferably defined by a Schmitt trigger, is driven by the oscillator 80 over line 88 and provides synchronous sample pulses for use in the sample and hold circuit as hereinafter described. Generally, the circuit 86 functions as a multipurpose device that synchronously demodulates the output of the differential amplifier and eliminates the unwanted quadrature component from the output signal. From the circuit 86, the output is a DC voltage the amplitude of which is proportional only to the difference between the variable capacitors 32 and the polarity of which is dependent upon the relative magnitude of the variable capacitors. The output from the sample and hold circuit is applied over line 90 to an operational amplifier 91 which is frequency compensated by network 92 to effect an extremely high DC gain with the necessary lead-lag compensation to stabilize the balance beam mechanism. This is of particular importance in a balance control system of the type described, since the beam position or displacement is measured to drive the system forcer coil in returning the beam to its null position.

The output from the operational amplifier 91 is applied over line 93 to a power amplifier circuit 94. When the amplifier output is negative, the forcer coil 35 is driven in a negative direction to effect null restoration for small negative loads. When the amplifier output is positive, it will develop a large coil current in the positive direction for driving the forcer coil.

The preferred form of monitor and control circuit 30 is illustrated in more detail in FIG. 6 wherein the variable capacitor terminals are represented at T1 and T2, the ground terminal at T3 and positive and negative power input and output terminals at T4 and T5, respectively. The resistor-capacitor combination 100 and 101 at the input T4 as well as the resistor-capacitor combination 102 and 103 at the output T5 serve to decouple the input power circuit. The oscillator circuit 80 includes a transistor 104 and associated resistor-capacitor components which affects only the system sample raised in the impedance of the capacitance sensors. Utilizing a high input impedance differential approach, the capacitive sensor is essentially immune to oscillator frequency variations.

Field effects transistors 105 and 106 make up the input stage of the system's AC differential amplifier 82; transistor 107 and associated components provide a constant bias for the input transistors; and a differential feedback is furnished by resistors 108 and 108' from the output transistors 109 and 110. The resistor-capacitor combination 112 defines a DC block between the output of the differential amplifier circuit and the input to the sample and hold transistor 114. In turn, the level detector 87 includes transistors 115 and 116 which are triggered by the oscillator output and are differentiated prior to driving a transistor 118. The output of transistor 118 is normally negative voltage with a limited pulse, on the order of 1 microsecond, going to ground and the pulses are synchronous with the output of the differential amplifier 87 and are phased to align with the peak output signal. Alignment is on the positive or negative peak, depending upon the relative magnitude of the sensor capacitors. Thus transistor 114 is activated during the synchronous sampling time; and once each period within the constant of the oscillator, it transfers the peak differential amplifier output voltage onto the hold capacitor 120. As a result, the DC voltage on capacitor 120 is equal to the peak AC output voltage of the differential amplifier which is only the capacitive component of the differential amplifier output, and is positive or negative depending upon the disposition of the balance beam with respect to its null position. As stated earlier, this DC voltage is the input to the system's operational amplifier 91 which includes a resistor 122 and capacitors 123, 124 for internal frequency compensation. Also a capacitor 125 is operative to "roll off" the high frequency gain of the amplifier and eliminate the voltage spikes that originate in the sample and hold circuit. Resistors 126, 127 together with capacitors 128, 129 define the lead-lag network 92 necessary for system stability.

The output of the operational amplifier drives the emitter follower pair 130 and 131 with the resistor 132 acting as a current limiter for amplifier protection. Additionally, resistor 134 is a current limiter for transistor 130. Resistor 135 eliminates the output deadband normally associated with the emitter follower circuits.

The circuitry described may be placed on printed circuit boards mounted in the section 140 of the base frame 20 rearwardly of the balance beam mechanism, as illustrated and in FIG. 3. In use, the base frame is levelled, for example, through levelling feet, not shown, at each corner of the baseplate and with the aid of a spirit level 142 affixed to the balance unit. All parts and components may be calibrated and adjusted in a conventional manner, for example, by employing an electronic testing unit, turning the power on and weighing calibrated weights at different positions on the pan. For the purpose of illustration and not limitation, the preferred form of loading apparatus described is primarily intended for use in weighing and recording of weights up to 1,200 grams and achieves sensitivity on the order of 0.1 grams. A counterweight 143 at the lower end of the beam leg 22, as well as the capacitor probe 26 and the means 28 is manually adjustable in calibrating and setting the beam mechanism to its null position. When a load is applied to the weigh pan the force of displacement through the beam leg is instantaneously sensed by the probe 26 and counteracted by the forcer coil 35 to restore the beam to its null position. Accordingly, actual movement of the beam is negligible as a result of the rapid response and reaction by the sensing circuit to any change whether positive or negative. An additional advantage and feature of the present invention is that the system is highly sensitive, yet is capable of sensing sudden weight increases without overloading the circuit.

It is therefore to be understood that the foregoing description is of a preferred embodiment of the present invention only, and it will be apparent to those skilled in the art that various changes and modifications may be made therein without departing from the invention.

What is claimed is:

1. In an automatic weigh balance having a balance beam wherein the load applied to the balance beam is measured by beam displacement from a null position, the improvement of:
    variable capacitance means associated with said balance beam for measuring the displacement of said balance beam by a change in capacitance;
    an AC signal source for generating an AC reference signal, said AC signal source being connected across said variable capacitance means to excite said capacitance means with said AC reference signal and generate an AC output representative of the change in the capacitance of said capacitance means;
    trigger means connected to said AC signal source for generating trigger pulses from said AC reference signal at the instant the AC output of said capacitance means is only the capacitive component of said AC output, and
    circuit means connected to said variable capacitance means and selectively triggered by said trigger pulses for generating a DC signal proportional to the magnitude of said AC output at the instants said trigger pulses are generated whereby to generate a DC signal proportional only to the capacitive component of said AC output of said variable capacitive means thereby to reject the unwanted quadrature component of said AC output.

2. The invention recited in claim 1 wherein said variable capacitance means is a capacitive bridge having two legs of said bridge formed by variable capacitors, one plate of each of said variable capacitors being fixed relative to said balance beam and the other plate of each of said variable capacitors being connected to said balance beam for movement therewith whereby the deflection of said balance beam from its null position is measured by the change in capacitance of said variable capacitors, and including:
    electrical null restoring means associated with said balance beam; and
    means including an operational amplifier connected between said circuit means and said null restoring means for driving said null restoring means in response to the DC signal generated by said circuit means an amount proportional to beam displacement whereby to return said beam to its null position.

3. In an automatic top-loading balance apparatus, the combination comprising
    a frame,
    a balance beam mechanism including a stabilized vertical balance beam leg movable from a null position in response to variations in load applied to said balance beam mechanism,
    electromagnetic actuating means between said frame and said balance beam including relatively movable field and core members with at least one of said members having an excitable forcer coil,
    a capacitive bridge including a pair of fixed capacitors and a pair of variable capacitors, each of said variable capacitors having a frame-mounted capacitor plate and a capacitor plate movable with said beam leg and so arranged as to sense the direction and extent of movement of said beam leg in a positive or negative direction,
    oscillator means connected to said capacitive bridge for generating an AC reference signal and exciting said capacitive bridge therewith,
    differential amplifier means for measuring the differential increase and decrease in capacitance of said variable capacitors and for generating a sinusoidal wave form proportional thereto,
    a sampling circuit for sensing the amplitude and phase of each wave form generated by said differential amplifier, said sampling circuit being selectively triggered by the AC reference signal to develop a variable DC output as a function only of the direction and extent of balance beam movement as measured by the changes in the capacitance of said variable capacitors by sampling only the capacitive component of each wave generated by said differential amplifier means thereby to reject the unwanted quadrature component of each wave generated by said differential amplifier means, and means connected to said sampling circuit for receiving said DC output and exciting the forcer coil of said electromagnetic actuating means with a DC signal proportional to beam displacement whereby to return said balance beam to its null position.

4. In an automatic top-loading balance apparatus according to claim 3, further including a level detector in said sampling circuit operative to generate sampling pulses synchronous with the capacitive component of said sinusoidal wave form in response to the AC reference signal whereby to selectively trigger said sampling circuit whenever one of said sampling pulses is generated and develop said DC output.

5. In an automatic top-loading balance according to claim 4, wherein said means connected to said sampling circuit for receiving said DC output and exciting said forcer coil includes an operational amplifier having a frequency compensation network to drive said forcer coil negatively or positively according to the negative or positive condition of the variable DC output of said sampling circuit.

6. In an automatic weigh balance system, the combination comprising a frame, a balance beam mounted on the frame for limited movement from a null position in response to variations in applied load, electrical null restoring means associated with said balance beam, sensor means for sensing the beam position in response to variations in applied load including a pair of vehicle capacitors and an AC signal source connected across said variable capacitors to apply an AC reference signal thereto, each of said variable capacitors having a stationary capacitive sensor and a beam-mounted capacitive sensor so arranged as to differentially sense the direction and extent of balance beam movement by changes in their respective capacitances, differential amplifier means connected to said variable capacitors for differentially amplifying the AC signals generated across said variable capacitors by said AC signal source and for generating a differential AC output in response to the direction and extent of balance beam movement as measured by the changes in the capacitances of said variable capacitors, circuit means for generating a DC signal as a function only of the capacitive component of the differential AC output generated thereby to reject the unwanted quadrature component of the differential AC output, and means connected to the circuit means for receiving the DC signal generated by said circuit means and energizing said null restoring means an amount proportional to beam displacement whereby to return said beam to the null position.

7. In an automatic weigh balance system according to claim 1, wherein said AC signal source is an oscillator and further including a capacitive bridge, said bridge including said variable capacitors and a pair of fixed capacitors, and said capacitance bridge being interposed between said oscillator and said differential amplifier means.

8. In an automatic weigh balance system according to claim 6 wherein said stationary capacitive sensors are mounted on said frame in adjacent relation to one another and said beam-mounted capacitive sensors are disposed on opposite sides of said stationary capacitive sensors.

9. In an automatic weigh balance system according to claim 6, said electrical null restoring means being defined by electromagnetic actuating means having relatively movable field and core members with at least one of said members having an excitable forcer coil.

10. In an automatic weigh balance system according to claim 9, further including a reference circuit having a resistor in series with the said forcer coil to generate a voltage proportional to the signal applied to said forcer coil.